(12) United States Patent
Meissner (10) Patent No.: US 9,786,900 B2
(45) Date of Patent: Oct. 10, 2017

(54) METHOD FOR PRODUCING A BATTERY FILLED WITH A LIQUID ELECTROLYTE, FILLING VESSEL THEREFOR, MACHINE AND BATTERY (75) Inventor: Eberhard Meissner, Wunstorf (DE)

(73) Assignee: Johnson Controls Autobatterie GmbH & Co. KGAA, Hannover (DE)

(*) Notice: Subject to any disclaimer, the term of this patent is extended or adjusted under 35 U.S.C. 154(b) by 632 days.

(21) Appl. No.: 14/239,238

(22) PCT Filed: Aug. 10, 2012

(86) PCT No.: PCT/EP2012/065670
§ 371 (c)(1),
(2), (4) Date: Jul. 1, 2015

(87) PCT Pub. No.: WO2013/024020
PCT Pub. Date: Feb. 21, 2013

(65) Prior Publication Data
US 2015/0349322 A1 Dec. 3, 2015

(30) Foreign Application Priority Data
Aug. 17, 2011 (DE) .................. 10 2011 110 479

(51) Int. Cl.
H01M 2/36 (2006.01)
H01M 10/10 (2006.01)
H01M 2/16 (2006.01)

(52) U.S. Cl.
CPC ........... *H01M 2/36* (2013.01); *H01M 2/1606* (2013.01); *H01M 2/361* (2013.01); *H01M 2/362* (2013.01); *H01M 10/10* (2013.01)

(58) Field of Classification Search
CPC ......... H01M 2/36; H01M 2/361; H01M 2/362
See application file for complete search history.

(56) References Cited

U.S. PATENT DOCUMENTS

RE20,627 E  *  1/1938 Mosher ................. H01M 2/362
                                                    137/261
2,131,592 A  *  9/1938 Lange .................... H01M 2/12
                                                     429/50

(Continued)

FOREIGN PATENT DOCUMENTS

CH           653809 A5      1/1986
CN           201699078      1/2011

(Continued)

OTHER PUBLICATIONS

EP 12751033.7 Office Action dated Nov. 9, 2015.
CN Office Action dated Jun. 3, 2015, 9 pages.

Primary Examiner — Matthew Merkling
(74) Attorney, Agent, or Firm — Fletcher Yoder P.C.

(57) ABSTRACT

The invention relates to a method for producing a battery (10) filled with a liquid electrolyte (2, 11), wherein the battery (10) comprises a housing (1) having a top side (3) lying at the top in the normal operation of the battery (10) and a bottom side (4) opposite the top side (3), wherein battery electrodes (6) are arranged in the housing (1) and the housing (1) has at least one filling opening (5) for the liquid electrolyte (2, 11), which filling opening is arranged on the top side (3) of the housing (1) or at least above the center of the housing (1), characterized in that liquid electrolyte (2, 11) is fed through the at least one filling opening (5) in such a way that the topmost point (16) of the battery electrodes (6) with respect to the direction of action of gravity is not completely covered with the liquid electrolyte (2, 11) at any time during the process of filling the battery with liquid electrolyte (2, 11). The invention further relates to a filling vessel designed for performing the method, to a machine, and to a battery.

19 Claims, 3 Drawing Sheets (56) References Cited

U.S. PATENT DOCUMENTS

| | | | |
|---|---|---|---|
| 3,166,447 A | 1/1965 | Bronstert et al. | |
| 3,249,132 A | 5/1966 | Eberle | |
| 5,201,924 A | 4/1993 | Mix et al. | |
| 6,635,387 B2 | 10/2003 | Fitter et al. | |
| 2003/0102029 A1* | 6/2003 | Crook | B60K 1/04 137/260 |

FOREIGN PATENT DOCUMENTS

| | | |
|---|---|---|
| CN | 201789002 | 4/2011 |
| DE | 1163413 A | 2/1964 |
| DE | 19526639 A1 | 1/1997 |
| DE | 202009016112 U1 | 3/2010 |
| EP | 0207742 A2 | 1/1987 |
| EP | 0504573 A1 | 9/1992 |
| GB | 665065 A | 1/1952 |
| GB | 690088 A | 4/1953 |
| JP | 05-225969 | 3/1993 |
| WO | 0171834 A2 | 9/2001 |
| WO | 2010053256 A2 | 5/2010 |

\* cited by examiner

METHOD FOR PRODUCING A BATTERY FILLED WITH A LIQUID ELECTROLYTE, FILLING VESSEL THEREFOR, MACHINE AND BATTERY

The invention relates to a method for producing an accumulator which is filled with a liquid electrolyte.

The invention relates to the field of accumulators which are intended to be filled with a liquid electrolyte, such as, for example, lead/acid batteries, as used, for example, as starter batteries for motor vehicles. Such an accumulator is known, for example, from U.S. Pat. No. 5,356,733. During the production of such an accumulator, filling with the liquid electrolyte is carried out in accordance with the procedure illustrated with reference to FIG. 1. The filling is carried out via a filling opening 5 which is arranged at an upper side 3 of the housing 1 or at least above the center of the housing 1. The battery 10 stands with the lower side 4 thereof on a horizontal surface. The inner space of the housing 1 is evacuated by means of reduced pressure. As a result of the reduced pressure, a predetermined quantity of liquid electrolyte 2 is drawn into the housing 1 through the filling opening 5. As a result of the rapid filling with the liquid electrolyte, there is formed above the battery electrodes 6 provided in the housing 1 a type of "lake", that is to say, an accumulation 7 of liquid electrolyte 2 which is then distributed further between the battery electrodes 6 and flows towards the lower side 4 as a result of gravitational force. In this instance, as a result of the incoming liquid electrolyte 2, gases are enclosed between the battery electrodes 6 or in a separator material which surrounds the battery electrodes 6 and cannot escape or can escape only with difficulty.

In particular in the case of very fine-fiber separator material, the escape of the gas is made more difficult as a result of capillary effects. However, even with battery electrodes which are constructed differently or with different casings of the battery electrodes, the effect described occurs.

The enclosed gases may, on the one hand, be quantities of ambient air which remain in spite of the evacuation operation. In addition, when filling a lead/acid battery with the liquid electrolyte, carbon dioxide may form relatively rapidly in many cases and, in the previously described type of filling operation, may also not be able to escape or be able to escape only with difficulty.

The accumulations of gas which remain in the region of the battery electrodes are undesirable since complete filling of the region of the battery electrodes with the liquid electrolyte is intended per se. In addition, with specific accumulator types, as a result of the enclosed gas bubbles, stains are formed on the separator material, which is also undesirable. Soluble substances can thus become separated and visibly deposited on the separator material.

An object of the invention is therefore to provide a method for producing an accumulator which is filled with a liquid electrolyte and which, during continuous filling with the liquid electrolyte, prevents or at least substantially reduces the enclosure of gas in the housing and any formation of stains on the separator material. Furthermore, a filling vessel which is suitable for this purpose, a machine for filling the filling vessel and a corresponding accumulator are intended to be provided.

The object is achieved by a method for producing an accumulator which is filled with a liquid electrolyte, wherein the accumulator has a housing having an upper side which is at the top during normal operation of the accumulator and a lower side which is opposite the upper side, wherein battery electrodes are arranged in the housing and the housing has for the liquid electrolyte at least one filling opening which is arranged at the upper side of the housing or at least above the center of the housing, wherein liquid electrolyte is supplied through the at least one filling opening in such a manner that at no time during the filling operation of the liquid electrolyte is the uppermost location of the battery electrodes in relation to the active direction of gravitational force completely covered by the liquid electrolyte.

The invention is based on an accumulator having a housing having at least one filling opening for the liquid electrolyte. A plurality of openings may also be provided, wherein, during the filling operation, the remaining openings may be closed. The at least one filling opening for the liquid electrolyte is arranged at the upper side of the housing, for example, in a cover portion. However, at least the filling opening is arranged above the center of the housing, that is to say, above a plane which is notionally central between the upper side and the lower side of the housing. It is proposed that liquid electrolyte be supplied through the at least one filling opening in such a manner that at no time during the filling operation of the liquid electrolyte is the uppermost location of the battery electrodes in relation to the active direction of gravitational force completely covered by the electrolyte. This has the advantage that, when the liquid electrolyte is supplied, at least one uppermost location of the battery electrodes in relation to the active direction of gravitational force is left free of liquid electrolyte. At this uppermost location, accumulations of gas can then escape without disruption. The escaping gas may, for example, first accumulate in a housing region which is located above the uppermost location of the battery electrodes or escape through an opening of the housing, for example, through the filling opening or another opening. As a result of the method according to the invention, the formation of the "lake" mentioned in the introduction on the surface of the battery electrodes is prevented so that a free path always remains for the gas being discharged. Consequently, an accumulator can be produced without the undesirable gas enclosures or with a substantially reduced quantity of gas enclosures. Another advantage of the method is that continuous filling of the accumulator with the liquid electrolyte can be carried out, that is to say, for instance, the filling operation does not have to be interrupted in order to allow enclosed gas to escape. This in turn has the advantage that the filling with the liquid electrolyte can be carried out as in the known method in a relatively rapid manner, which is advantageous for an industrial production process. In the method, provision may further be made for evacuation of the housing in order to support the filling operation.

Another advantage is that the filling of the housing and consequently the wetting of the battery electrodes is carried out substantially from the lower side thereof, although the filling opening is located at a higher position. The gas impelled by the liquid front is not enclosed and a dry gas discharge path is kept free. This advantageously leads to relatively homogeneous filling of the accumulator and homogeneous wetting of the battery electrodes. The production of less well-filled locations of the accumulator is consequently prevented. Homogeneous behavior of the accumulator and consequently greater efficiency of the accumulator can thereby be achieved.

Figure 1:
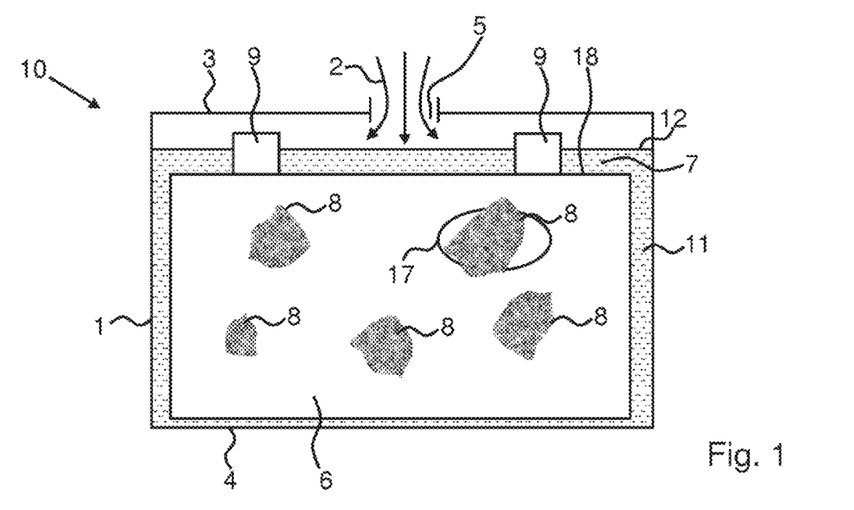
FIG. 1 shows an accumulator, in which a filling operation is carried out in accordance with the prior art, and FIGS. 2 to 4 each show an accumulator, in which a filling operation is carried out according to the invention.

The uppermost location of the battery electrodes, in the case of a horizontally extending accumulator, may be considered to be the upper edge of the battery electrodes which faces the upper side of the housing and which, in the known method illustrated with reference to FIG. 1, is covered by the liquid electrolyte. In the case of an accumulator which is not horizontal, the uppermost location of the battery electrodes with respect to the active direction of gravitational force may be, for example, an upwardly extending corner of the battery electrodes.

The invention is suitable for all types of accumulator, which are intended to be filled with a liquid electrolyte, regardless of the type and structure of the battery electrodes. The invention is suitable both for battery electrodes which are completely surrounded by a separator material, that is to say, which are located in a casing which is formed by the separator material in the manner of a pocket, and for battery electrodes in which different types of separator are used. The invention is suitable for battery electrodes in which the separator material protrudes beyond the edges of the battery cage, which is regularly the case, for example, with the pocket-like construction of separators, and for battery electrodes which have separators which do not protrude beyond the battery cage. In this regard, in the context of the present application, the separator is understood to be a portion of the battery electrode. If the separator protrudes beyond the cage of the battery electrode, it is advantageous for the uppermost location of the battery electrodes, which is intended to be kept free from the liquid electrolyte during the filling operation of the liquid electrolyte, to be considered to be the uppermost location of the protruding separators of the battery electrode. If a large number of battery electrodes are provided to form a so-called battery electrode stack in a cell of the accumulator, that is to say, a large number of battery electrodes which are arranged directly adjacent to each other, it is advantageous for the uppermost location of the battery electrode stack to be kept free from the liquid electrolyte during the filling operation of the liquid electrolyte.

The invention can be used with prismatic housing structural shapes and with other housing structural shapes, for example, with round or oval housings.

The accumulator can be formed as a single-cell or multi-cell accumulator. If the accumulator is constructed with multiple cells, the embodiments relating to the housing also apply with reference to a respective housing portion of the accumulator housing, which portion in each case surrounds a cell of the accumulator. In the case of a single-cell accumulator, the corresponding housing portion of a cell may accordingly also form the entire housing of the accumulator. With a multi-cell accumulator, there is advantageously provision for each cell or each housing portion of a cell to have at least its own filling opening for the liquid electrolyte.

The filling of the accumulator with the liquid electrolyte can be carried out in a controlled or uncontrolled manner. In the case of uncontrolled filling, the supply of the liquid electrolyte is intended to be adjusted, for example, by means of tests, in such a manner that, during the filling operation, the uppermost location of the battery electrodes is not covered by the electrolyte. This may, for example, be carried out by adjusting a metering tap. According to an advantageous development of the invention, the liquid electrolyte is introduced into the housing in a metered manner by means of a control system. This has the advantage that the control system can ensure that at no time during the filling operation of the liquid electrolyte is the uppermost location of the battery electrodes in relation to the active direction of gravitational force completely covered by the electrolyte.

The control system may be constructed as an active or passive control system. In the case of an active control system, a controller is provided, for example, in the form of a mechanical or electronic controller, to which there is supplied an input variable, such as, for example, the current filling level of the liquid electrolyte in the housing. The controller then controls the filling level to a predetermined desired value. The desired value is advantageously determined in such a manner that at no time during the filling operation of the liquid electrolyte in relation to the active direction of gravitational force is the uppermost location of the battery electrodes completely covered by the electrolyte. The control system may also be constructed in a passive manner, for example, in the case of filling by means of the filling vessel explained below via at least one elongate hollow member.

According to an advantageous development of the invention, liquid electrolyte is supplied through the at least one filling opening in such a manner that at no time are the upper edges of the battery electrodes facing towards the upper side completely covered by the liquid electrolyte. This has the advantage that filling of the accumulator can be carried out using production devices which are already provided and in which the accumulator, as illustrated in FIG. 1, is arranged horizontally. New or changed production devices do not then have to be provided. With the known production devices, therefore, an accumulator can be produced without the undesirable gas enclosures or with a substantially reduced quantity of gas enclosures.

According to an advantageous development of the invention, the accumulator is placed in an oblique manner or on its side during the filling operation of the liquid electrolyte. This has the advantage that a defined gas discharge location which is located in a relatively high position can be provided for the filling operation. Another advantage is that the filling of the accumulator according to the invention can be further optimized in terms of the auxiliary means used, such as, for example, the filling vessel which has not yet been described, or the speed of the filling operation. In particular, more rapid filling can be carried out, with the undesirable gas enclosures being prevented, even when uncontrolled filling is carried out. When the accumulator is positioned in an oblique manner, the lower side of the housing may, for example, be inclined through at least 10° with respect to a horizontal face, or through at least 30° or in a range from 45 to 135°. For example, an inclination through approximately 30° is advantageous. An inclination through 90° is also advantageous, which ultimately corresponds to placing the accumulator or the housing on the side.

According to an advantageous development of the invention, after the filling operation of the liquid electrolyte, there is provision for a dwell time of the accumulator, during which the accumulator continues to be placed in an oblique manner or on its side. The dwell time is a form of rest time, during which the liquid electrolyte can be distributed in a uniform manner and remaining gas can escape. According to an advantageous development of the invention, the inclined position of the accumulator is reduced during the dwell time. After the dwell time has elapsed, the accumulator is then in a horizontal position again.

According to an advantageous development of the invention, the inclined positioning of the accumulator is carried out with an accumulator in which the housing portion which surrounds a cell of the accumulator has a longer and a shorter housing side, the longer housing side being longer than the shorter housing side, over the shorter housing side of the housing portion. In the case of a single-cell accumulator, the housing portion may also form the entire housing. The inclination is consequently produced about an axis perpendicular relative to the longer side. This has the advantage that the height difference between the lower side and the higher side of the housing portion can be maximized. It is also possible to provide the inclined position over the longer housing side or at the same time over the shorter and the longer housing side.

According to an advantageous development of the invention, a material which surrounds the battery electrodes and which absorbs liquid takes up the liquid electrolyte during the filling operation of the liquid electrolyte. The material which absorbs liquid advantageously permanently takes up the liquid electrolyte and also retains it after the filling operation. The invention is therefore also particularly suitable for accumulators with fine-fiber separator material, which surrounds the battery electrodes. The separator material then absorbs the liquid electrolyte. The material which absorbs liquid may be a porous mat of micro-glass fibers, it also being possible for a specific proportion of polymer fibers to be contained. The method is particularly suitable for accumulators in the form of AGM batteries.

According to an advantageous development of the invention, a filling vessel which contains the liquid electrolyte is connected to the housing by means of at least one elongate hollow member, for example, a hose or a pipe, by the elongate hollow member being guided through the at least one filling opening into the inner side of the housing as far as a position which is lower with respect to the active direction of gravitational force than the at least one filling opening. The liquid electrolyte then flows out of the elongate hollow member at an outlet opening of the elongate hollow member and flows into the inner side of the housing of the accumulator. This has the advantage that the filling of the accumulator according to the invention can be carried out with simple and cost-effective auxiliary means. The filling vessel may, for example, be constructed as a simple plastics bottle or as a bag. In the case of a multi-cell accumulator, a plurality of filling vessels may be secured beside each other in a retention member so that parallel filling of the individual accumulator cells can be carried out by means of a filling vessel which is associated with a respective accumulator cell. Another advantage is that the filling vessel can already be provided in advance with a defined quantity of liquid electrolyte so that the actual filling operation takes only a few hand movements, which do not require any particularly high level of qualification. Each accumulator cell only has to be connected to a filling vessel via the respective elongate hollow member. The filling operation may be carried out by the action of gravitational force, that is to say, the liquid electrolyte flows as a result of gravitational force from the filling vessel via the elongate hollow member into the housing of the accumulator. This operation can further be readily automated.

The metering of the quantity of liquid may then be carried out, for example, by means of appropriate selection of the through-flow cross-section of the elongate hollow member or by means of a metering valve on the filling vessel or the elongate hollow member. The filling vessel may, for example, have a pressure compensation opening, through which air can flow into the filling vessel. The filling vessel may have the pressure compensation opening, for example, at the upper side.

According to an advantageous development of the invention, the filling vessel is further constructed so as to be closed, that is to say, the outlet opening of the elongate hollow member is the only opening. This has the advantage that passive control of the metered supply of the liquid electrolyte can be carried out in a cost-effective manner. The liquid electrolyte flows through the elongate hollow member into the housing only until the outlet opening is covered by the electrolyte level in the housing and pressure compensation with the filling vessel can no longer take place. The reduced pressure which is then formed in the filling vessel prevents further flow of the electrolyte into the housing until the electrolyte level in the housing has fallen again and releases the outlet opening. By means of the adjustment of a desired position of the outlet opening of the elongate hollow member in the housing of the accumulator, a desired electrolyte level can consequently be adjusted and maintained during the entire filling operation, which is advantageous for adequate gas discharge. In particular with an accumulator with battery electrodes which are surrounded by material which absorbs liquid, as a result of the absorption of the liquid and capillary effects there is complete wetting of the battery electrodes with the electrolyte even above the electrolyte level which has been controlled in this manner so that the controlled electrolyte level can be determined so as to be relatively low, which is again advantageous for the gas discharge at the upper location of the battery electrodes. The further development mentioned is particularly advantageous when the elongate hollow member in the path from the filling vessel to the outlet opening of the elongate hollow member has a continuous downward gradient.

According to an advantageous development of the invention, an outlet opening of the elongate hollow member is lower with respect to the active direction of gravitational force than the uppermost location of the battery electrodes with respect to the active direction of gravitational force.

According to an advantageous development of the invention, the elongate hollow member has two channels which are separated from each other, wherein a first channel is used to supply electrolyte into the housing and a second channel is used to supply air into the filling vessel. This has the advantage that, as a result of the two channels which are separated from each other, a defined pressure compensation can be achieved in the filling vessel and, at the same time, the previously mentioned passive control of the electrolyte level can be carried out. Another advantage is that the elongate hollow member does not necessarily have to have a continuous downward gradient from the filling vessel to the outlet opening, but may also have, for example, an upwardly directed curve. The handling of the filling vessel is thereby further simplified. Advantageously, for example, the first channel may terminate substantially at the same height position with respect to the active direction of gravitational force as the second channel. This has the advantage that, during the pressure compensation in the filling vessel, bubbles are formed to a lesser extent. Another advantage is that the first channel for the electrolyte supply may terminate at a lower location than the second channel for the air supply. This has the advantage that the level, to which the electrolyte level is controlled, is determined by the higher air intake opening of the second channel whilst the lower outlet opening of the first channel is always immersed in the electrolyte liquid. Particularly homogeneous electrolyte supply to the housing without formation of bubbles in the housing can thus be achieved.

According to an advantageous development of the invention, an outlet opening of the first channel is arranged substantially at the same height within the housing as an air intake opening of the second channel.

The invention further relates to a filling vessel which has an elongate hollow member connected thereto and which is configured to carry out a method of the above-described type.

The invention further relates to a machine which is configured to fill one or more filling vessels of the type described above with liquid electrolyte. According to an advantageous development, the machine is configured to automatically fill a respective filling vessel with a predefined quantity of liquid electrolyte. This has the advantage that prefilled filling vessels which already have the correct quantity of liquid electrolyte can be provided. This enables simple and reliable filling of an accumulator, without the quantity of liquid to be used having to be ensured in detail.

The invention further relates to an accumulator having a housing having an upper side which is located at the top during normal operation of the accumulator and a lower side opposite the upper side, having battery electrodes in the housing, of which at least one battery electrode is/are surrounded by separator material, and at least one filling opening for the liquid electrolyte which is arranged at the upper side of the housing or at least above the center of the housing, and having liquid electrolyte introduced, characterized in that the separator material is free from stains or the stain size per stain does not exceed 2 cm$^2$ or 3% of the entire separator surface-area of one side of the battery electrodes. The accumulator may, for example, be produced in accordance with one of the previously mentioned methods.

The invention is explained in greater detail below with reference to embodiments using drawings, in which.

In the Figures, the same reference numerals are used for elements which correspond to each other.

FIG. 1 shows an accumulator 10 in which liquid electrolyte 2 according to the prior art explained in the introduction is supplied. The liquid electrolyte 2 is introduced under the action of reduced pressure through the filling opening 5 into the housing 1 in such a manner that the accumulation of liquid 7 which has already been mentioned in the introduction is produced above the battery electrodes 6. The liquid electrolyte 11 which is already located in the housing 1 in this instance has a level 12. The battery electrodes 6 which are illustrated in the Figures additionally with connection lugs 9 for electrical contacting are surrounded by a fibrous separator material. In the filling operation according to claim 1, gas bubbles 17 remain in the region of the battery electrodes, for example, in the separator material. Owing to corresponding reactions, planar stains 8 are formed in the separator material, substantially at those locations at which the gas bubbles 17 have formed.

Figure 2:
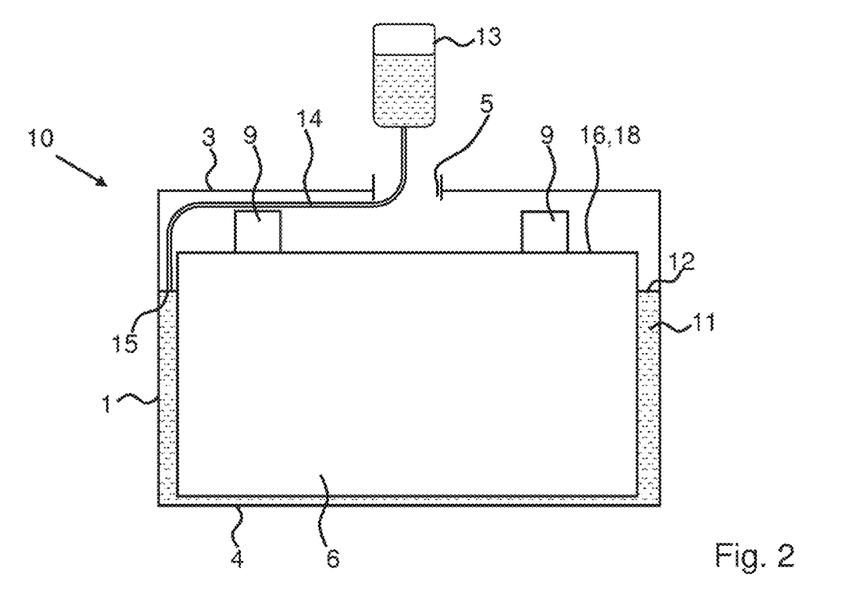

FIG. 2 shows an accumulator 10 in which liquid electrolyte is supplied in a metered manner by means of passive control. The accumulator 10 has a housing 1 having an upper side 3 which is located at the top during normal operation of the accumulator 10 and a lower side 4 which is located opposite the upper side 3. Normal operation is intended to refer to the position of an accumulator which is in accordance with specifications and which substantially corresponds to a horizontal position, slight deviations from the horizontal position being permitted. The accumulator 10 has inside the housing 1 battery electrodes 6 which are surrounded by a separator material which absorbs liquid. The battery electrodes 6 have the connection lugs 9. The accumulator 10 is located in the embodiment according to FIG. 2 in a horizontal position. There is further illustrated a filling vessel 13, for example, in the form of a bottle or a bag. The filling vessel 13 is connected to an elongate hollow member 14 which is constructed as a hose in the embodiment illustrated. The hose 14 is guided through the filling opening 5 as far as a desired level 12 of the liquid electrolyte 11 in the housing 1. The hose 14 terminates with an outlet opening 15, from which the liquid electrolyte is discharged from the hose 14. The filling vessel 13 is filled with the liquid electrolyte. The filling vessel 13 is retained with a retention device which is not illustrated. The filling vessel 13 is further constructed in a closed manner. By the selection of the position of the outlet opening 15, which is located slightly below the upper edge 18 of the battery electrodes 6, there is maintained in a controlled manner an electrolyte level which is also below the upper edge 18 of the battery electrodes 6. The upper edge 18 of the battery electrodes 6 thereby remains free from the liquid electrolyte so that gas can escape in an upward direction.

Figure 3:
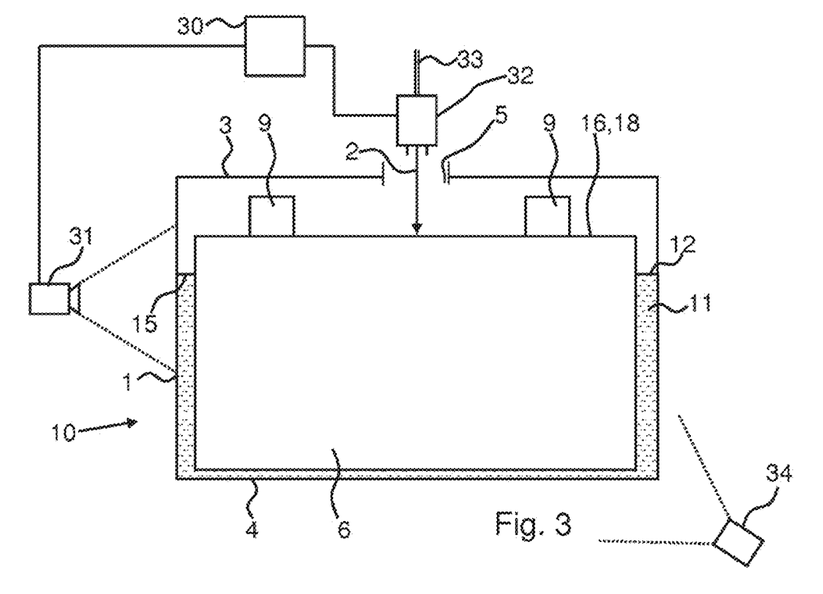

FIG. 3 shows an accumulator 10 during the filling operation of the liquid electrolyte. For metered supply of the liquid electrolyte, active control which is carried out by means of a control device 30, 31, 32 is provided. The control device 30, 31, 32 has a controller 30, a sensor 31 and an actuator 32. The controller 30 may, for example, be in the form of an electronic controller, for example, an electronic circuit having a microprocessor which has corresponding programming in order to carry out the control function. The sensor 31 is configured in order to detect the level 12. The sensor 31 may be produced in different manners, for example, in the form of an electronic camera which is illustrated in FIG. 3 and which takes images of the accumulator 10 from a housing side, or an ultrasound sensor which is fitted to the upper side 3 of the housing 1 and which detects the level 12 in a contact-free manner, or a mechanical sensor, for example, having a float. In the embodiment illustrated in FIG. 3, the sensor which is constructed as a camera 31 detects the level 12 in an optical manner. To this end, the housing 1 is constructed in a transparent manner at least at the side which is detected by the camera 31 so that, by processing the images taken by the camera 31, the level 12 can be established. In order to improve the contrast during the image detection, there may additionally be provided, for example, a light source 34 which illuminates the accumulator 10. The light source 34 may, for example, emit colored light. The contrast between the region of the accumulator 10 filled with the electrolyte 11 and the region which is not filled with the electrolyte 11 is thereby increased so that better image detection by the camera 31 is achieved. The camera 31 may also be constructed as a thermal imaging camera, or a temperature sensor may be provided. In this instance, the level 12 can be established by means of a temperature measurement, it having to be ensured that the temperature of the electrolyte 11 introduced differs from the temperature of the housing 1. This allows the level 12 to be established, even when housings are completely non-transparent.

The actuator 32 may be constructed as an electrically actuatable metering valve, which discharges liquid electrolyte which is supplied via a supply channel 33 through the filling opening 5 in a metered manner into the housing 1. The controller 30 evaluates the data transmitted by the sensor 31, determines therefrom an actual value of the level 12, compares it with a desired value and controls the actuator 32 in such a manner that the quantity 2 of incoming electrolyte does not become excessively large so that the actual value of the level 12 does not exceed the desired value.

Figure 4:
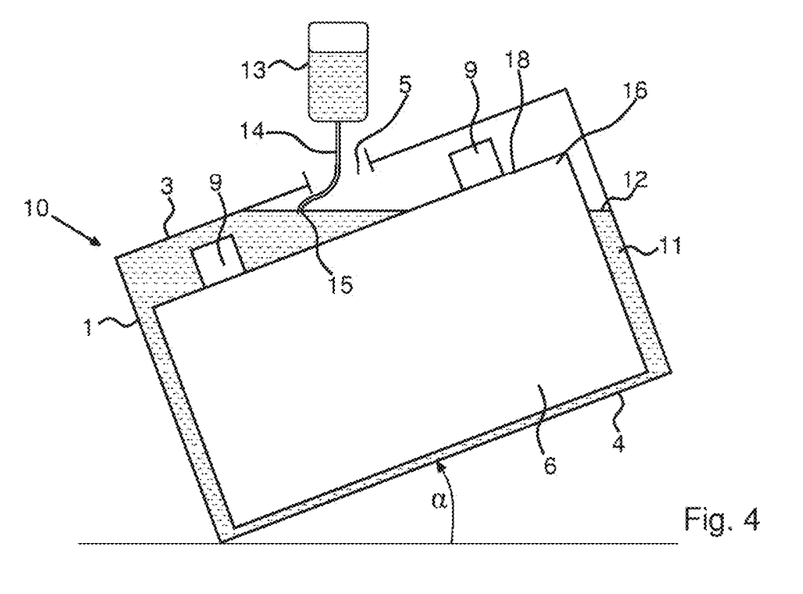

FIG. 4 shows an accumulator 10 which is positioned in an oblique manner during the filling operation of the liquid electrolyte. As can be seen, an angle α is formed between the horizontal and the lower side 4 of the housing 1. As a result of the oblique position, there is a larger spacing of the uppermost location 16 of the battery electrodes in this state with respect to the active direction of gravitational force, which location is in this instance not formed by the upper edge 18 of the battery electrodes. The oblique position or a positioning of the accumulator on its side during the filling operation enables relatively rapid filling with the liquid electrolyte, even when the supply of electrolyte is not controlled. However, the provision of a control system is additionally advantageous.

Figure 5:
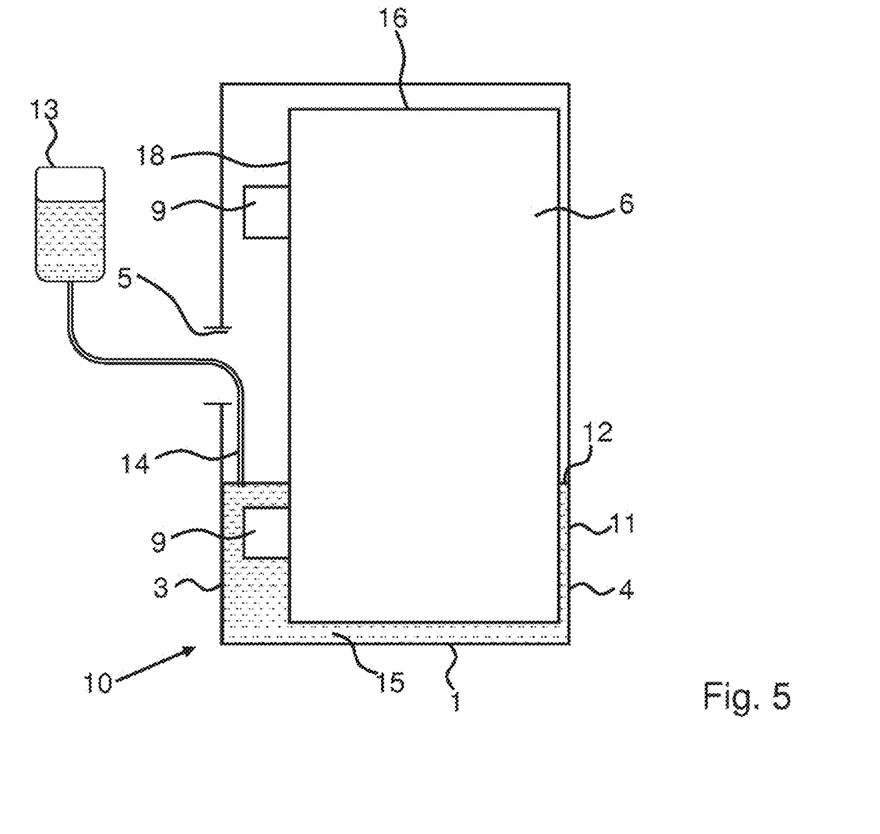
FIG. 5 shows an accumulator having a filling vessel.

FIG. 5 shows an accumulator 10 which is placed on its side during the filling operation of the liquid electrolyte. It can be seen that in this state both the upper side 3 and the lower side 4 of the housing 1 are orientated vertically. In the embodiment according to FIG. 5, for example, the filling vessel 13 which has already been described with reference to FIG. 2 and which has the hose 14 is used for filling. As can be seen, as a result of the lateral support of the accumulator 10 during the filling operation, a large spacing is produced between the uppermost location 16 of the battery electrodes 6 in the active direction of gravitational force in comparison with the level 12. The level 12 is in this instance intended to be selected in such a manner that it is not higher than the filling opening 5. However, complete filling with the predetermined quantity of liquid electrolyte is possible without liquid electrolyte flowing from the filling opening 5 again. This is achieved with the separator material which absorbs the liquid and which receives the liquid electrolyte during the filling operation. Owing to the capillary action, the separator material is also wetted with the liquid electrolyte above the filling opening 5.

Figure 6:
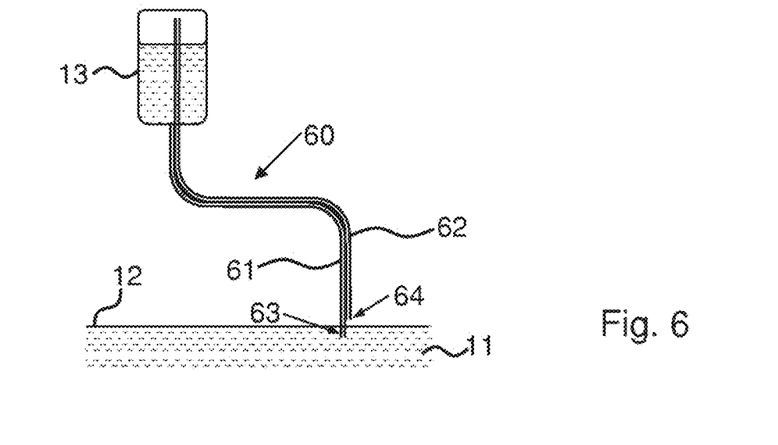
FIG. 6 shows another embodiment of a filling vessel.

FIG. 6 shows an embodiment of a filling vessel 13 having an elongate hollow member 60 which has two channels 61, 62 which are separated from each other. The channels 61, 62 may be, for example, formed in the manner of individual hoses or pipes, or as channels which are separated from each other within the same hose or pipe. A first channel 61 serves to supply electrolyte into the housing 1. The first channel 61 terminates at an outlet opening 63. A second channel 62 serves to supply air to the filling vessel 13. The second channel 62 has an air intake opening 64. The air intake opening 64 may, for example, be arranged at the same height as the outlet opening 63, that is to say, substantially at the height of the level 12 of the liquid electrolyte. The air intake opening 64 may also be arranged at a higher or lower location. It is advantageous for the air intake opening 64 to be arranged slightly above the outlet opening 63.

The accumulator 10 which is illustrated in the Figures may be constructed with one cell or multiple cells. If it is constructed with multiple cells, the Figures each show the filling of one cell.

The invention claimed is:

1. A method for manufacturing an accumulator, comprising:
  filling the accumulator with liquid electrolyte, wherein the accumulator comprises a housing having an upper side and having a lower side opposite the upper side, battery electrodes disposed in the housing, and a filling opening arranged along the upper side of the housing, wherein filling the accumulator with liquid electrolyte comprises supplying the liquid electrolyte to the accumulator via the filling opening such that the liquid electrolyte does not at any time during filling completely cover an uppermost portion of the battery electrodes, the uppermost portion of the battery electrodes being the uppermost portion with respect to a direction of gravitational force during filling.

2. The method of claim 1, comprising:
  disposing a filling vessel containing the liquid electrolyte proximate the housing, wherein the filling vessel is coupled to an elongate hollow member;
  guiding the elongate hollow member through the filling opening and into an inner side of the housing; and
  directing the liquid electrolyte from the filling vessel through the elongate hollow member and into the accumulator.

3. The method of claim 2, comprising guiding the elongate hollow member into the inner side of the housing such that an outlet opening of the elongate hollow member is at a lower position with respect to the direction of gravitational force than the uppermost portion of the battery electrodes.

4. The method of claim 2, wherein the filling vessel is entirely closed other than an opening from the filling vessel to the elongate hollow member.

5. The method of claim 2, wherein the elongate hollow member comprises a first tube and a second tube extending from the filling vessel, wherein the method comprises directing the liquid electrolyte from the filling vessel into the accumulator via the first tube and directing air from the accumulator into the filling vessel via the second tube.

6. The method of claim 5, comprising guiding the elongate hollow member into the inner side of the housing such that an outlet of the first tube is lower with respect to the direction of gravitational force than an outlet of the second tube.

7. The method of claim 5, comprising guiding the elongate hollow member into the inner side of the housing such that an outlet of the first tube is at substantially the same height as an outlet of the second tube with respect to the direction of gravitational force.

8. The method of claim 2, comprising:
  securing a plurality of filling vessels each containing the liquid electrolyte beside each other via a retention member;
  disposing the retention member such that each of the plurality of filling vessels is disposed proximate a corresponding one of a plurality of accumulator cells formed in the housing, wherein each of the plurality of accumulator cells has respective battery electrodes disposed therein and has a respective filling opening disposed along the upper side of the housing;
  guiding each of the plurality of elongate hollow members through the corresponding filling openings and into the respective accumulator cells; and
  directing the liquid electrolyte from the plurality of filling vessels into the respective accumulator cells through the plurality of elongate hollow members.

9. The method of claim 2, comprising stopping a flow of the liquid electrolyte into the inner side of the housing when a liquid level of the liquid electrolyte in the inner side of the housing reaches an outlet of the elongate hollow member disposed in the inner side of the housing.

10. The method of claim 2, comprising metering a flow of the liquid electrolyte into the inner side of the housing via a metering valve on the filling vessel or on the elongate hollow member.

11. The method of claim 1, comprising controlling the filling of the accumulator with the liquid electrolyte via a control system.

12. The method of claim 11, comprising detecting a liquid level of the liquid electrolyte in the accumulator via a sensor and controlling the filling of the accumulator with the liquid electrolyte based on the liquid level detected by the sensor.

13. The method of claim 12, wherein the sensor comprises an optical sensor.

14. The method of claim 13, comprising illuminating the accumulator via a light source to increase the contrast while detecting the liquid level of the liquid electrolyte via the optical sensor.

15. The method of claim 12, wherein the sensor comprises a temperature sensor.

16. The method of claim 1, comprising:
positioning the accumulator in a tilted position relative to an operating position, wherein the upper side of the accumulator in the operating position is at the top of the accumulator with respect a direction of gravitational force during operation of the accumulator; and
filling the accumulator with liquid electrolyte while the accumulator is in the tilted position.

17. The method of claim 16, wherein positioning the accumulator in the tilted position comprises positioning the accumulator 90 degrees from the operating position so that the accumulator is supported on a side of the accumulator.

18. The method of claim 16, wherein positioning the accumulator in the tilted position comprises tilting the accumulator to an inclination between approximately 45 degrees and 135 degrees from the operating position.

19. The method of claim 16, maintaining the accumulator in the tilted position for a predetermined amount of time after filling the accumulator with the liquid electrolyte and moving the accumulator from the tilted position to the operating position after the predetermined amount of time has passed.

* * * * *

UNITED STATES PATENT AND TRADEMARK OFFICE
CERTIFICATE OF CORRECTION

PATENT NO. : 9,786,900 B2
APPLICATION NO. : 14/239238
DATED : October 10, 2017
INVENTOR(S) : Eberhard Meissner It is certified that error appears in the above-identified patent and that said Letters Patent is hereby corrected as shown below:

In the Claims

1. In Column 11, Line 15, in Claim 16, delete "respect a" and insert -- respect to a --, therefor.

Signed and Sealed this
Twentieth Day of March, 2018

Andrei Iancu
*Director of the United States Patent and Trademark Office*